(12) United States Patent
Schwegler et al.

(10) Patent No.: US 6,247,486 B1
(45) Date of Patent: *Jun. 19, 2001

(54) LIQUID FILTER WITH BUILT-IN PRESSURE REGULATOR

(75) Inventors: Helmut Schwegler, Pleidelsheim; Bernhard Lucas, Mundelsheim; Wolfgang Bueser, Freiberg, all of (DE); Ulrich Projahn, Madrid (ES)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 89 days.

(21) Appl. No.: 08/857,938

(22) Filed: May 16, 1997

(30) Foreign Application Priority Data

Sep. 28, 1995 (DE) ............................................... 195 36 084

(51) Int. Cl.⁷ ............................. G05D 11/00; B01D 15/00
(52) U.S. Cl. ..................... 137/115.27; 137/544; 123/510; 210/446
(58) Field of Search ..................................... 137/544, 549, 137/509, 510, 115.27; 123/510, 514, 511, 463; 210/196, 130, 46.4, 446, 443, 458, 428, 429, 109, 116

(56) References Cited

U.S. PATENT DOCUMENTS

| | | | |
|---|---|---|---|
| 3,695,438 | | 10/1972 | Malpassi . |
| 4,011,848 | * | 3/1977 | Coddington . |
| 4,971,689 | * | 11/1990 | Burrows ................................ 210/130 |
| 5,078,167 | * | 1/1992 | Brandt et al. . |
| 5,275,203 | * | 1/1994 | Robinson ............................. 123/463 |
| 5,433,241 | * | 7/1995 | Robinson ............................. 137/549 |

FOREIGN PATENT DOCUMENTS

| | | |
|---|---|---|
| 92 14 297 | 12/1994 | (DE) . |
| 4430852A1 * | 4/1995 | (DE) . |
| 443 04 71 | 2/1996 | (DE) . |
| 0 702 142 A1 | 3/1996 | (EP) . |

* cited by examiner

Primary Examiner—John Rivell
(74) Attorney, Agent, or Firm—Michael J. Striker

(57) ABSTRACT

A liquid filter (10) with a built-in pressure regulator (11) for fuel is proposed, wherein the pressure regulator (11) with its diaphragm (41) is built on the housing (12) on a component (18) on the front with at least one connection (19). The disk-shaped diaphragm (41) has a single clamping site (39) on its external circumference and a centrally arranged movable closure closure member (42). The diaphragm (41) is acted upon by pressure in a pressure chamber (45) connected with the clean side against the force of a spring (49) in a gas-filled spring chamber (48). The integration of the pressure regulator (11) in the housing (12) permits a simple, compact, cost-effective construction of the liquid filter (10), through whose valve (44) in the pressure regulator (11) only cleaned fuel flows and which is insensitive to backpressure in the tank connection (17).

12 Claims, 5 Drawing Sheets

LIQUID FILTER WITH BUILT-IN PRESSURE REGULATOR

PRIOR ART

Figure 1:
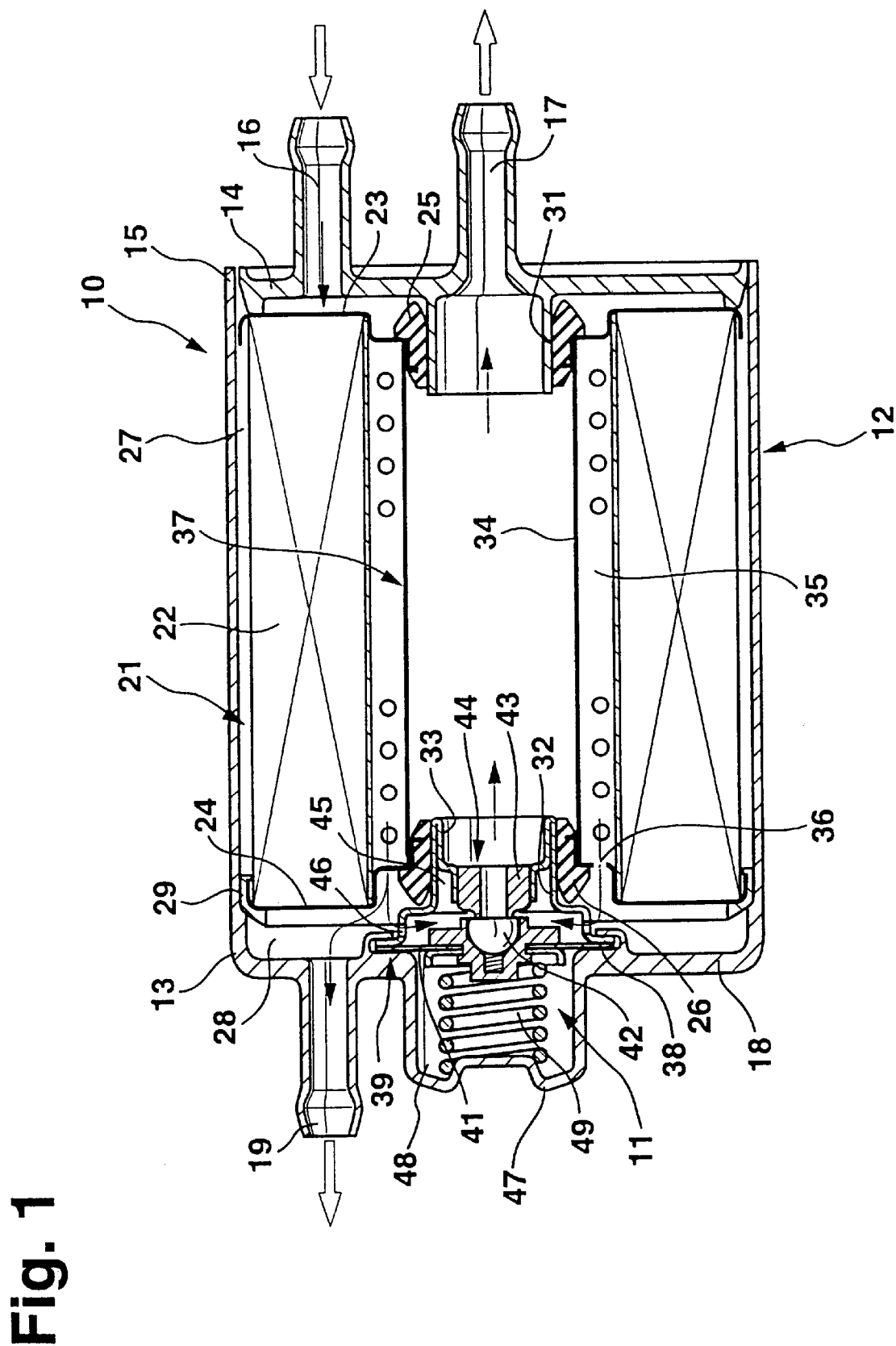

The invention relates on a liquid filter with a built-in pressure regulator for fuels in accordance with the species disclosed in more detail in the preamble of claim 1.

Such a liquid filter with a built-in pressure regulator for fuels is already known from U.S. Pat. No. 5,078,167, wherein the otherwise separate components, such as the filter and the pressure regulator, are combined in a common unit and are known by the name returnless fuel systems (RLFS). The pressure regulator of such a liquid filter operates with a diaphragm, on which the pressure to be regulated acts against the force of a spring. It is disadvantageous in connection with the liquid filter that the flow through the filter element here goes from the inside to the outside, which can result in a considerable reduction of its service life; bridges can be formed because of deposits, which reduce the entry cross section, which is critical in particular when large amounts of dirt are developed. Furthermore, it is necessary here to return the pressure from a clean side of the filter element to a side of the diaphragm, for which purpose an elaborate chamber structure on the diaphragm is required. It is furthermore disadvantageous here that the pressure regulator is placed between the inlet connector and the tank connector and therefore is completely situated on the dirt side of the filter element. Because of this dirt particles can get into the valve of the pressure regulator and hamper its function. The actual valve of this pressure regulator represents a component separated from the diaphragm, which results in a relatively elaborate construction, which also requires many shaped sheet metal elements. The ring-shaped diaphragm must be clamped on its inner and its outer edge, because of which the risk of drift is increased. Furthermore, this filter is designed for installation in a tank and has an unguided fuel return, so that it is not well suited for connection by means of lines. Mainly, however, the function of the pressure generator is interferingly affected by possible backpressure, which occurs in particular when using jet pumps in the tank.

A liquid filter with a built-in pressure regulator is furthermore known from U.S. Pat. No. 4,011,848, wherein the liquid filter is essentially designed as a line filter, on whose oppositely located front ends of the housing the inlet connector and outlet connectors are disposed. A third connector with the tank, in which a simple ball valve is provided as the pressure regulating valve, extends radially from the side of the housing. A safety valve is furthermore assigned to the outlet connector, which is intended to block the connection to the tank when the fuel supply fails. The pressure regulator of this liquid filter is also directly connected with the dirt side. The pressure regulator here operates without a diaphragm and, because of the ball valve used, is relatively inaccurate and prone to become dirty. The perpendicular position in respect to each other of the connectors for the outlet connector and the tank connector is very unfavorable in many installation cases.

A liquid filter is furthermore known from DE 44 30 852 A, into whose housing cover a pressure regulator has been integrated in such a way that the flow through the filter element runs from the outside to the inside and the pressure regulator lies on the clean side. The embodiment of the pressure regulator in the cover cannot be seen there; the cover with the pressure regulator requires much space.

ADVANTAGES OF THE INVENTION

In contrast thereto, the liquid filter in accordance with the invention with a built-in pressure regulator for fuels, having the characterizing features of the main claim, has the advantage that an extremely simple, compact and cost-effective construction is made possible with this integration of the pressure regulator into the liquid filter, wherein the operation of the pressure regulator is independent of any backpressure at all; therefore it can be easily used in connection with jet pumps in the tank, since their backpressure no longer has an effect on the pressure control. Since pressure medium acts on the pressure regulator only from the clean side, only clean fuel flows through all its components, so that wear or leaks caused by jammed dirt particles is impossible. With this type of construction it is furthermore possible the the flow through the filter element takes place in the most advantageous manner from the outside to the inside, so that by means of this the same service life as with a filter alone can be achieved. The liquid filter with the integrated pressure regulator can be easily and simply installed at any arbitrary location of the vehicle; no additional connections at the tank are necessary. The integrated construction of the pressure regulator allows a particularly assembly-friendly structure which, because of its cost-efficient construction, is also suitable for throw-away filters. The amount of liquid flowing off when the pressure regulator is actuated can flow off relatively unhampered, which favors a compact and small structural size. Also, the danger of flow noises and pressure pulses is considerably reduced, since the liquid flow is guided without any extensive deviations and has an essentially constant course from the inlet to the outlet. The pressure regulator compensates a possible pressure drop, which can be caused by the addition of a filter in an advantageous manner in that the regulation is performed on the clean side.

Advantageous further developments and improvements of the liquid filter with a built-in pressure regulator disclosed in the main claim are possible by means of the steps recited in the dependent claims. Thus, by means of claim 2, an increased service life can be achieved because of the advantageous flow through the filter element. Embodiments in accordance with claims 3 and 4 favor a simple and compact construction, which in addition can be made more cost-effective and is advantageous in assembly and handling. Furthermore, the embodiments in accordance with claims 5 to 8 are also advantageous, wherein the arrangement of the inlet connector and the tank connector on the same front face of the housing results in short hose connections between the filter and the tank. The disposition of the pressure regulator in the housing also results in that the clamping position of the diaphragm, which is critical in connection with sealing, is located inside the housing, so that no additional sealing place toward the exterior is created. It is also possible to save a component by integrating the pressure regulator in the housing. It is advantageous for a safe and extended operation of the pressure regulator if in accordance with claims 9 or 12 a sealed connection is provided. It is furthermore advantageous if in accordance with claim 10 the pressure regulator is embodied as a plug-in module, because of which it can be constructed particularly cost-effectively and simply; in addition, the danger of an excursion of the diaphragm is reduced by the pressure connection at the clamping position. A particularly advantageous and compact construction results in accordance with claims 12 to 16, which in addition permits a simple assembly. In this connection it is advantageous if in accordance with claim 17 plastic components are used. Further advantageous embodiments ensue from the remaining claims, the specification and the drawings.

DRAWINGS

Figure 2:
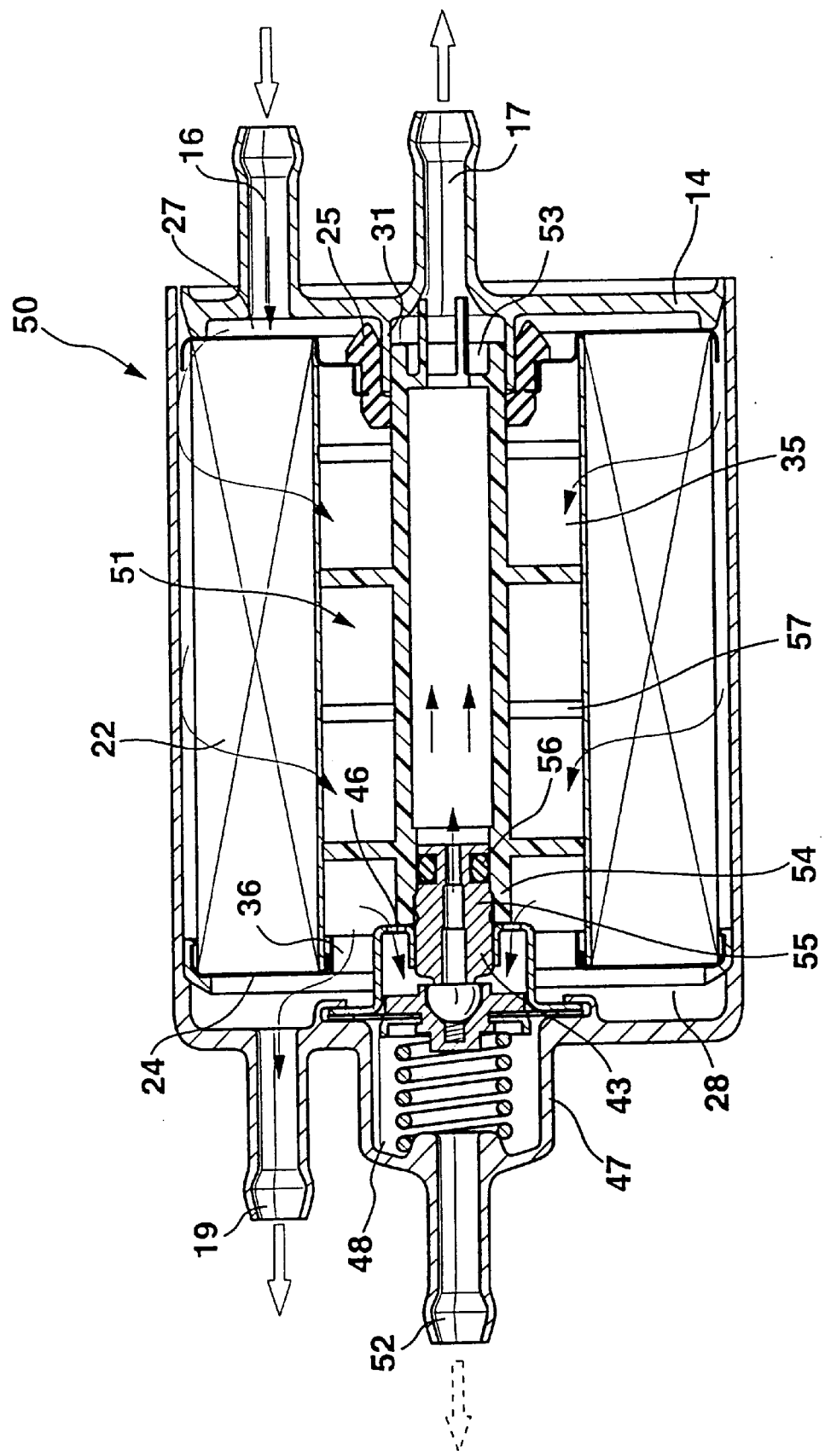
Figure 3:
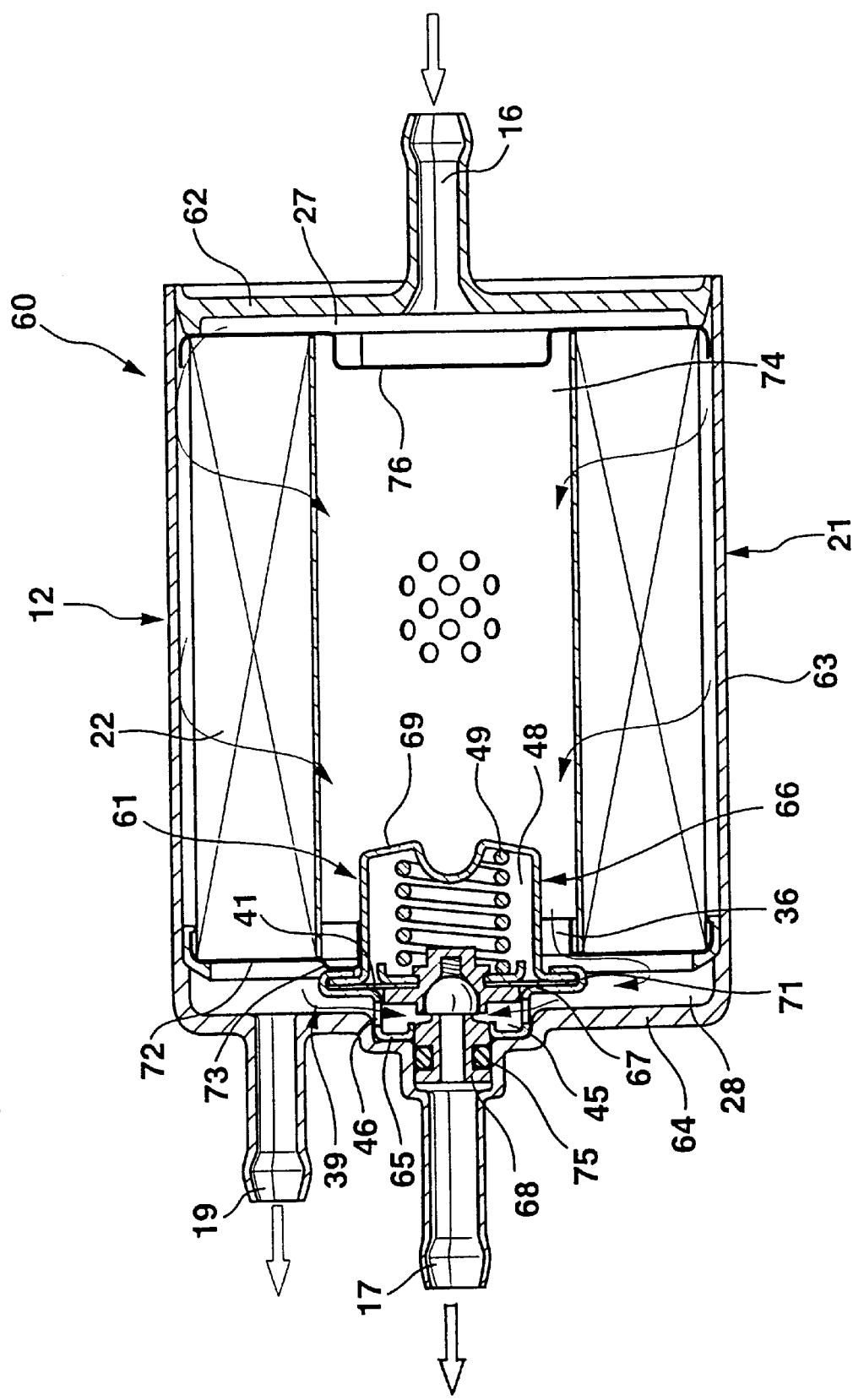
Figure 4:
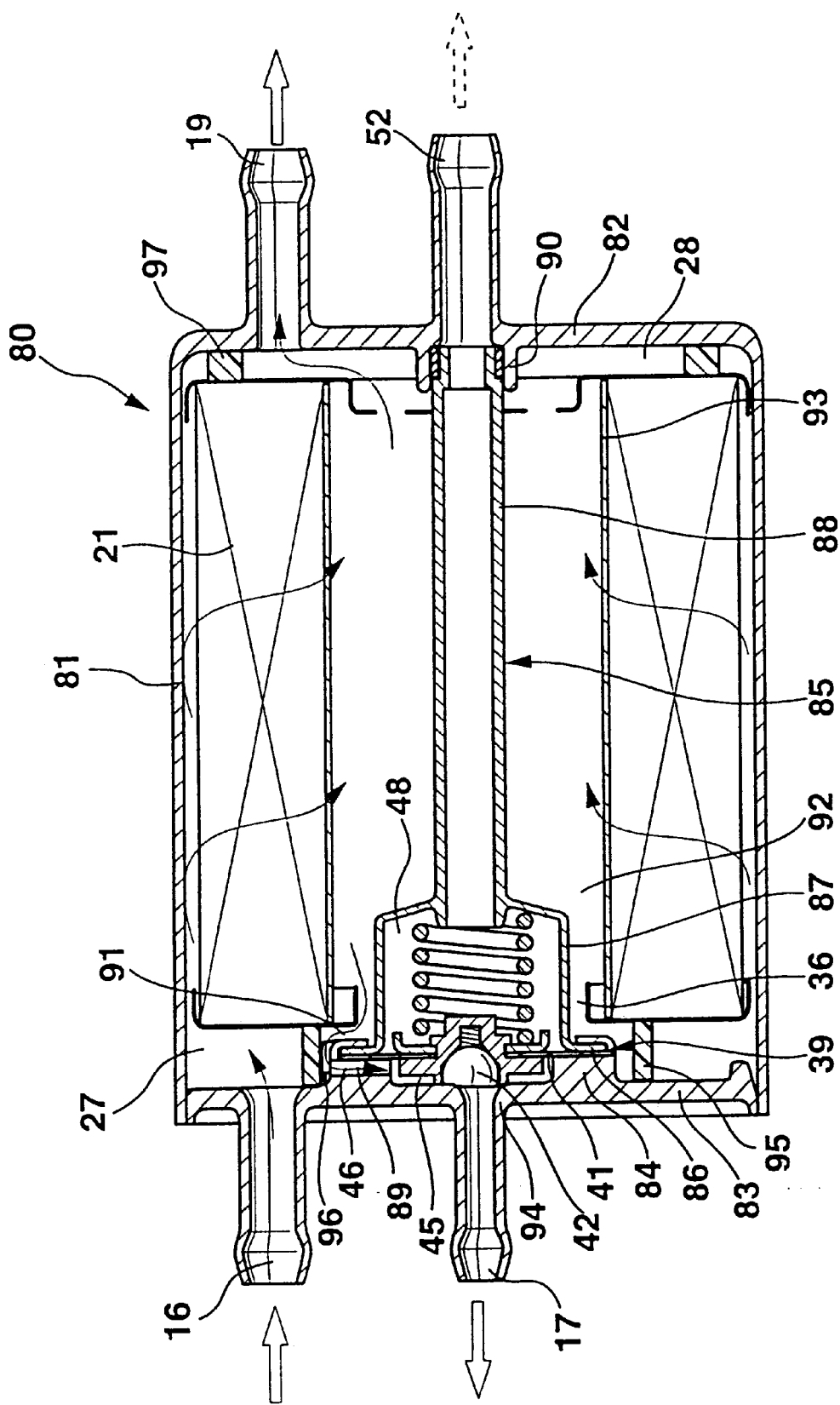
Figure 5:
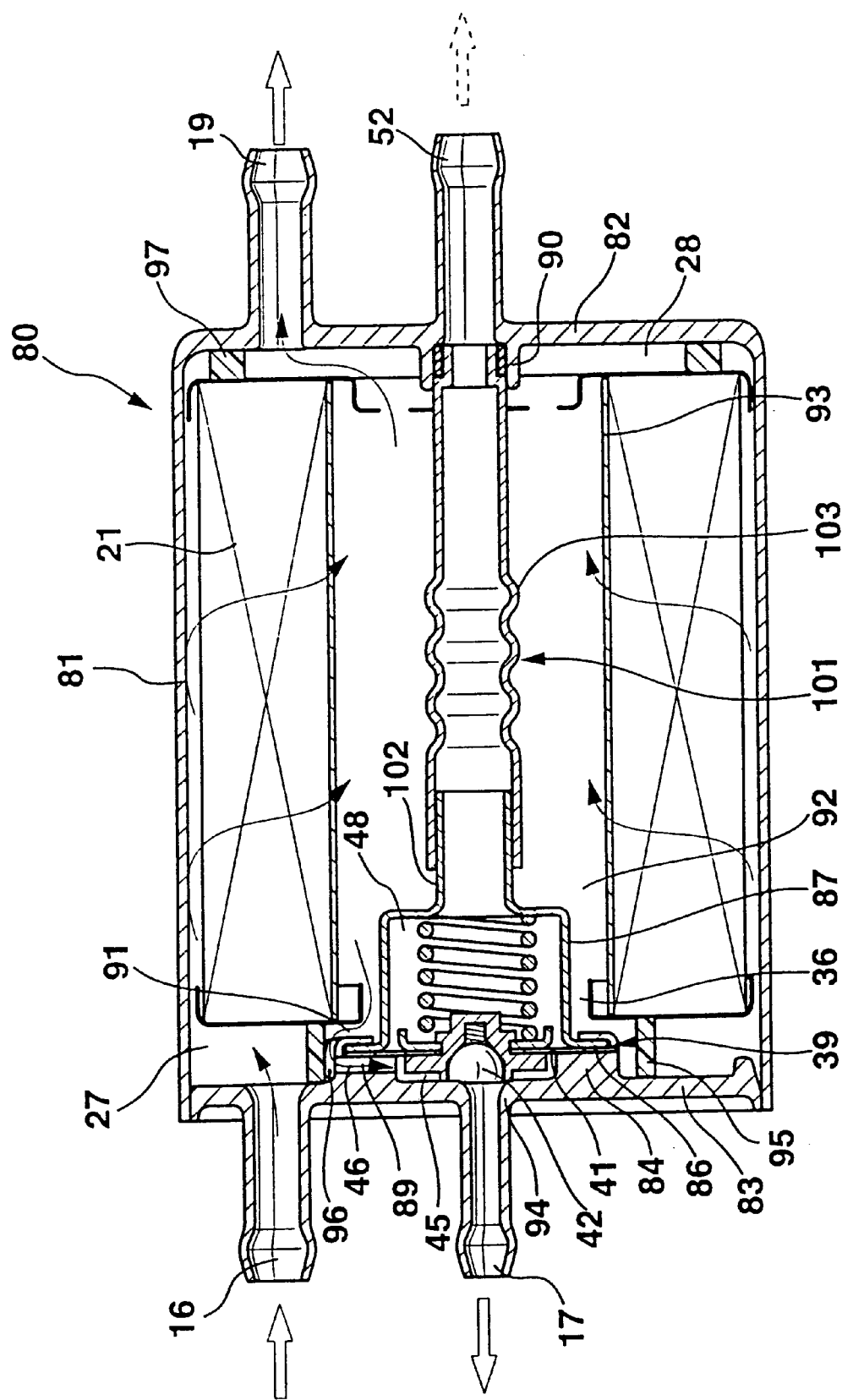

Four exemplary embodiments of the invention are represented in the drawings and explained in detail in the following description. FIG. 1 shows a longitudinal section through a first exemplary embodiment of a liquid filter with a built-in pressure regulator for fuel in a simplified representation, FIG. 2 shows a longitudinal section through a second exemplary embodiment with a venting connection, FIG. 3 shows a longitudinal section through a third exemplary embodiment with a pressure regulator embodied as a plug-in module, and FIG. 4 shows a fourth exemplary embodiment with plastic components in a simplified representation and FIG. 5 represents a longitudinal section through another ventilation tube for the filter in accordance with FIG. 4.

DESCRIPTION OF THE EXEMPLARY EMBODIMENTS

FIG. 1 shows a liquid filter 10 with a built-in pressure regulator 11 for fuels, wherein the liquid filter 10 is essentially designed as a line filter and the pressure regulator 11 is integrated into the bottom of a cup-shaped housing element.

The liquid filter 10 has a housing 12 of aluminum, which essentially consists of a cup-shaped housing element 13 and an associated cover 14. These two elements 13, 14 are welded together on their outer rim 15. An inlet connection 16 is formed on the cover 14, through which fuel coming from the tank is supplied to the liquid filter 10. A tank connection 17 is furthermore embodied centrally on the cover 14, through which fuel can flow off into the tank upon actuation of the pressure regulator 11. An outlet connection 19 is provided on the bottom 18 of the cup-shaped housing element 13, through which cleaned fuel leaves the liquid filter 10 and is conducted in the direction toward the injection valves. The inlet connection 16 and the outlet connection 19 are located coaxially in respect to each other as well as outwardly radially offset in respect to the longitudinal axis on its edge. All connections 16, 17, 19 are embodied as pipe connectors for hose connections.

A filter element 21, which here has a star insert 22 through which the flow passes radially from the exterior to the interior, is interposed between the inlet connection 16 and the outlet connection 19 in the interior of the housing 12. The star insert 22 is held in a sealing manner in the filter element 21 between end caps 23, 24 on the front side, wherein the inner rim of the end caps 23, 24 projects into annular shaped seals 25, 26 of the same kind, with the help of which a seal between the dirty side 27 connected with the inlet connection 16 and the clean side 28 connected with the outlet connection 19 is provided. A third shaped seal 29 is arranged on the end cap 24 on the outlet side for this purpose. An inward projecting central tube connector 31 is formed on the cover 14 for this separation between the dirt and clean sides, on which the filter element 21 with its shaped seal 25 is supported and in the process provides sealing. The filter element 21 is seated with the other shaped seal 26 on a sleeve-shaped section 32 of a support element 33, which is simultaneously a part of the pressure regulator 11. A central tube 34 extends in the filter element 21 between the repeatedly stepped inner rims of the end caps 23, 24 and, together with the inner wall of the star insert 22, delimits an annual chamber 35, which is connected via opening cross sections 36 in the end cap 24 on the outlet side with the clean side 28, while it is separated from the dirt side 27 by the end cap 23 on the inlet side. A double-walled central tube 37 is embodied in this way in the filter element 21.

The support element 33 is essentially designed as a tube-shaped element with a repeatedly stepped diameter which, at its end opposite the sleeve-shaped section 32, terminates in an annular radially extending collar 38, with which it is sealingly fastened on the inside of the bottom 18 in a circularly extending clamping site 39. This clamping site 39 is embodied as a beaded site and is additionally used for sealingly and fixedly clamping of a circular diaphragm 41 of the pressure regulator 11 on its exterior circumference. In this way the clamping site 39 takes on a dual function and has as large as possible an exterior diameter, so that just enough structural space remains available for the outlet connection 19. The diaphragm 41, which is only clamped on its exterior circumference, has a centrally arranged closure member 41 in its center, which here is embodied as a ball section. This closure member 41 cooperates with a valve seat 43, which is disposed fixed on the housing and sealingly fastened in the sleeve-shaped section 32 of the support element 33. The valve seat 43 and the closure member 42 constitute the actual valve 44 of the pressure regulator 11, which controls the connection from the clean side 28 to the tank connection 17. In this way a pressure chamber 45 is delimited in the pressure regulator 11 upstream of the valve 44 between the movable diaphragm 41 and the support element 33, which is connected via several through-openings 46 in the support element 33 with the clean side 28, so that the fuel can flow unhampered into the pressure chamber 45 and can act on the side of the diaphragm 41 facing the filter element 21.

On its bottom 18 the cup-shaped housing element 13 has a dome-shaped bulge 47 formed toward the exterior and centrally placed, which is covered in the interior of the housing 12 by the diaphragm 41. Together with the diaphragm, 41, this bulge 47 delimits a spring chamber 48, which contains a spring 49 of the pressure regulator 11. On the one side, the spring 49 is supported on the bulge 47 and on the other side on the diaphragm, 41. In this case the diaphragm 41 is embodied as a vapor-tight plastic disk, such as is also known by the designation Kapton foil, so that the diffusion of fuel into the spring chamber 48 is prevented and ventilation of this spring chamber 48 is not necessary.

The function of the liquid filter 10 with the integrated pressure regulator 11 is described in what follows:

The fuel, coming from the tank as a rule, is supplied to the liquid filter 10 via the inlet connection 16 and reaches the dirt side 27 in the interior of the housing 12. The fuel flows radially from the outside to the inside through the star insert 22, is cleaned and reaches the annular chamber 35 and flows, via the opening cross sections 36 in the end cap 24 on the outlet side, to the clean side 28 and further to the outlet connector 19 in the direction of the consumers, which in the instant case are injection nozzles. The pressure prevailing on the clean side 28 also acts via the through-openings 46 in the support element 33 upstream of the valve 44 in the pressure chamber 45, and thus also on the side of the diaphragm 41 facing the filter element 21, which on the opposite side is acted on by the spring 49. In this case a defined pressure is preset by means of the spring 49. If this preset pressure in the pressure regulator 11 is exceeded, the valve 44 is opened, and the fuel flows from the clean side 28 via the pressure chamber 45, the opened valve 44 into the central tube 34, and further via the tank connector 17 into a backflow reservoir. In the course of the opening of the valve 44, the closure member 42 movably seated in the diaphragm 41 is lifted of the valve seat 43. Since the pressure regulator 11 is only acted upon from the clean side 28, only cleaned fuel flows through all its components and in this way wear or leaks because of dirt particles become impossible. Furthermore, by means of the arrangement of the filter element 21 it is assured that the flow through it takes place radially from the outside to the inside and therefore a long service life can be achieved. The liquid filter 10 can be easily installed in a vehicle with little effort because of the embodiment of all connections 16, 17, 19 on the housing 12, in particular in the axial direction. Together with the integrated pressure regulator 11, the housing element 13 constitutes an assembly group which can be pre-assembled and is easy to manipulate and install and permits presetting of the pressure regulator 11. An additional seal toward the exterior can be omitted because of the position of the clamping site 39 for the diaphragm 41 in the interior of the housing 12, so that the sealing problem is considerably reduced. The embodiment of the tank connection 17 and the inlet connection 16 on the same front side of the housing permits relatively short hose connections between the liquid filter 10 and the tank. The integration of the pressure regulator 11 on the housing side permits an extremely compact, simple and cost-effective construction, particularly since the housing element 13 takes over sealing functions for the liquid filter 10 as well as the pressure regulator 11. Corrosion damage of the components of the pressure regulator 11 is reduced because of its position in the housing, so that it is possible to use simpler materials in its production.

FIG. 2 shows a longitudinal section through a second liquid filter 50, which differs from the liquid filter in FIG. 1 in the following manner, wherein the same reference numerals are used for like components.

The second liquid filter 50 differs mainly in that a plastic tube 51 is used as the double-walled central tube 37 and that a venting connection 52 is placed on the spring chamber 48. With its end 53 situated on the dirt side 27, the plastic tube 51 is guided in the tube connector 31 of the cover 14 and is used at the same time as a spacing support of the cover 14 in the cup-shaped housing element 13. Sealing is performed by the shaped seal 25 which at the same time rests against the end 53. The plastic tube 51 is guided with its other end 54, located on the clean side 28, on a sleeve-shaped extension 55 of the valve seat 43 and sealed by means of an O-ring 56. Radially extending ridges 57 lie on the exterior circumference of the plastic tube 51, which lead up to the star insert 22, constitute the annular chamber 35 and keep the opening cross sections 36 open in the area of the end cap 24 on the clean side. The through-openings 46 on the support element 33 are now arranged in such a way, that the flow passes through them in the axial direction. A cost-effective solution with a simple construction can be achieved with the aid of the plastic tube 51, which furthermore is easy to assemble. It is now possible to ventilate the spring chamber 48 continuously with the aid of the venting connection 52, so that a simpler and cheaper construction of the diaphragm 41 is possible. Furthermore, in a manner known per se it is possible to affect the actuating pressure of the pressure regulator 11 via the venting connection 52. Otherwise the function of the second liquid filter 50 corresponds to that of the first liquid filter 10 in accordance with FIG. 1.

The plastic tube 51 takes over several functions; it is used for centering the star insert 22 and for returning the amount of returned fuel and supports the star insert 22 toward the inside when the fuel flowing through presses from the outside against the soiled filter paper and acts on it toward the inside.

FIG. 3 shows a longitudinal section through a third liquid filter 60, which differs from the first liquid filter 10 in accordance with FIG. 1 in the following manner, wherein the same reference numerals are used for like components.

Mainly the position of the tank connection has been changed in the third liquid filter 60, and the pressure regulator 11 is embodied as a plug-in module. To this end the housing 12 has a cover 62, on which the inlet connection 16 alone is centrally disposed in the longitudinal axis of the liquid filter 60. The tank connection 17 is now embodied on the cup-shaped housing element 63 coaxially with the inlet connection 16 and centered on the bottom 64, while the position of the outlet connection 19 remains unchanged. A repeatedly stepped bore 65 makes a transition on the bottom 64 into the tank connection 17, wherein the regulator housing 66 of the plug-in module 61 has been plugged into this bore 65. In this case the regulator housing 66 itself consists of the support element 67 embodied to be dynamically balanced, the valve seat 68 and the spring housing 69. The support element 67 and the cup-shaped spring-housing 69 are solidly connected on the outer rims, wherein they constitute the clamping site 39 for the diaphragm 41 at the same time. This clamping site 39 is simultaneously embodied as a radially outward projecting collar 71, on which the end cap 72 on the clean end is supported by an inside-located bead 73, so that opening cross sections 36 of the center tube 74, which here is single-walled, remain toward the clean side 28. The valve seat 68 is sealingly fastened on the inner rim of the support element 67 and projects bolt-like from the regulator housing 66. Thus, during the insertion of the plug-in module 61 into the bore 65 on the bottom 64, the pressure regulator 11 is secured in the radial direction by the valve seat 68, while the support element 67 takes on the axial support. Sealing of the clean side 28 in respect to the tank connection 17 is performed by an O-ring 75 disposed on the valve seat 68. The spring housing 69 containing the spring 49 can project unhampered into the central tube 74. On its side facing the dirt side 27, the central tube 4 is closed by a continuous end cap 76.

A simple and compact structure of the liquid filter 60 in accordance with FIG. 3 can be obtained by the arrangement of the pressure regulator 11 in the area of the tank connection 17 on the bottom of the cup-shaped housing element 63, wherein the pressure regulator can be embodied as a simple plug-in module 61. Mounting of the liquid filter 60 is particularly simple, wherein the plug-in module 61 can be tested separately. With this construction a simple central tube 74 is sufficient, which is closed on the dirt side 27 by a continuous end cap 76. With the plug-in module 61 it is necessary to seal the spring chamber 48 in a fuel vapor-tight manner against the side 45 in which fuel flows, to which end a Kapton foil can be used between the diaphragms 41.

In principle, the function of the third liquid filter 60 is similar to that of the first filter 10 in accordance with FIG. 1. The fuel which flows via the inlet connection 16 to the dirt side 27 flows radially from the inside to the outside through the star insert 22 and reaches, cleaned, the central tube 74, from where it reaches the clean side 28 via the opening cross sections 36 and flows on to the outlet connection 19. Via the through-openings 46, the pressure on the clean side 28 can also build up in the pressure chamber 45 and act on the diaphragm 41 against the force of the spring 48. If the actuating pressure of the pressure regulator is exceeded, its valve opens and permits fuel to flow off from the pressure chamber 45 to the tank connection 17.

Because of the arrangement of the plug-in module 61 between the bottom 64 and the filter element 21 and the cover 62, the liquid filter 60 has the advantage that a sort of a pressure connection is achieved, wherein a positive force is always exerted on the beaded clamping site 39, so that the danger of an excursion of the rim of the diaphragm 41 is reduced.

FIG. 4 shows a longitudinal section through a fourth liquid filter 80, which differs from the first liquid filter 10 in accordance with FIG. 1 mainly by the integration of the pressure regulator 11 in the cover and a ventilation conducted through it, wherein the same reference numerals are used for components which are the same as in FIG. 1.

In its bottom 82 the cup-shaped housing element 81 of the liquid filter 80 has a centrally disposed venting connection 52, while the outlet connection 19 is disposed offset radially outward in respect to the latter. The tank connection 17 is located on the cover 83 coaxially in respect to the venting connection 52 and therefore centered, while the inlet connection 16 is disposed coaxially with the outlet connection 19. The pressure regulator 11 is installed in the area of the tank connection 17 on the inside of the cover 83, for which purpose an annular ridge 84, which axially projects into the interior of the housing, is embodied on the inside of the cover 83. The clamping site 39 for the diaphragm 41 is located at the protruding end of this annular ridge 84, wherein a radial flange 86 of a ventilation tube 85 is sealingly and tightly clamped into this clamping site 39 in addition. Starting at its flange 86, the ventilation tube 85 makes a transition into a widened sleeve section 87, which essentially encloses the spring chamber 48 and subsequently makes a transition into a tube element 88 of lesser diameter, whose free end projects into a connector 90 coming from a venting connection 52 and is sealed there. This ventilation tube 85 can be made of plastic in a cost-effective manner. Through-openings 46 to the pressure chamber 45 in the form of radially extending bores 89 are cut into the annular ridge 84, which have a connection via conduits 91 and the opening cross sections 36 with the annular chamber 92 between the center tube 93 and the ventilation tube 85 and therefore are further in connection with the clean side 28 and the outlet connection 19. The closure member 42 of the pressure regulator 11 cooperates with a valve seat 94, which in this case is formed directly on the inside of the cover 83 in an extension of the tank connection 17. On its exterior circumference, the annular ridge 84 is enclosed in a support ring 95, which is radially centered by ribs 96 fastened on the cover 83 and is supported between the cover 83 and the end cap of the filter element 21. Radially viewed, the inlet connection 16 is located outside of this support ring 95, which therefore separates the dirt side 27 from the clean side 28. On the side opposite the support ring 95, the filter element 21 is supported via a sealing holding ring 97 on the bottom 82 of the housing element 81. For separating the dirt side 27 from the clean side 28, the diameter of this holding ring 97 has been selected to be such that, viewed in a radial direction, it lies outside the outlet connection 18.

Because of the integration of the pressure regulator 11 directly into the cover 83 near the centrally disposed tank connection 17, together with the ventilation tube 85 embodied as a plastic tube, the liquid filter 80 makes possible a particularly compact and cost-effective construction.

In principle, the function of the fourth liquid filter 80 is comparable with that of the first liquid filter 10, wherein in addition the spring chamber 48 is vented to the outside via the ventilation tube 85 and the venting connector 52. From the inlet connection 16, the inflowing fuel reaches the dirt side 27 of the filter 80, flows radially from the outside to the inside through the filter element 21 and reaches the clean side 28 via the annular chamber 92 and then the outlet connection 19. The pressure can also build up via the conduits 91 and the bores 89 in the pressure chamber 45 and act on the diaphragm 41 against the force of the spring. When the actuating pressure is exceeded, fuel is controllably removed from the pressure chamber 45 via the tank connection 17.

The same as the liquid filters 10, 50, 60, the fourth liquid filter 80 has the advantage that the pressure regulator 11 is insensitive to a possibly occurring backpressure in the tank connection 17. Therefore the fuel flowing off via the tank connection 17 can be brought into the tank by means of a jet pump, wherein the occurring backpressure does not exert any influence on the regulating function. The backpressure can only act on the relatively small effective surface of the closure member 42, but not in the pressure chamber on the relatively large effective surface of the diaphragm 41, so that the regulating function of the pressure regulator 11 is not interferingly affected.

FIG. 5 shows a longitudinal section through a portion of a filter with a different ventilation tube 101, such as can be used in place of the ventilation tube 85 of the fourth liquid filter 80 in accordance with FIG. 4. The ventilation tube 101 has a spring housing 102 embodied as a deep-drawn sheet metal element and a corrugated tube 103 embodied as a flexible plastic tube. With this construction it is possible to set the pressure regulator by swaging of the spring housing 102, wherein the spring prestress is increased by denting. The requirement of coaxiality between the pressure regulator and the ventilation tube is moot here. A longitudinal extension of the filter when acted upon by pressure has no effect on the set spring housing 102. A possibly tilted position between the spring housing 102 and the corrugated tube 103 in respect to the connector 90 is also insignificant. Furthermore, the cover 83 with the built-on ventilation tube 101 can be transported and handled more advantageously, which is of interest when the pressure regulator and the filter are produced separately. Therefore the construction in accordance with FIG. 5 is particularly advantageous.

Changes of the embodiments represented are of course possible without departing from the spirit of the invention. The liquid filters with the integrated pressure regulator 11 can easily be designed in such a way that, besides a construction of aluminum, steel and plastic, they also make possible a construction of mixed materials; in particular, in the pressure control component it is possible to use more plastic elements in place of the sheet metal elements. The pressure regulator can also be equipped with a sliding valve in place of the seat valve.

What is claimed is:

1. A liquid filter, comprising a housing provided with an inlet connection connected with a dirt side, an outlet connection connected with a clean side, and a tank connection, said housing being composed of a cup-shaped housing element and a cover closing an open end of said housing element; a filter element; a pressure regulator integrated in said housing at an end side and having a valve so that a liquid flowing over said valve of said pressure regulator when said pressure regulator is actuated flows through said tank connection; a diaphragm associated with said pressure regulator, said diaphragm being tightly clamped in said housing and acted upon by a liquid pressure against a spring pressure so as to control said valve of said pressure regulator; a spring applying said spring pressure, said pressure regulator being located between said clean side and said tank connection, said diaphragm having a single clamping site on an outer circumference directly in said housing and constituting a moveable closure member in a center, said pressure regulator having a valve seat which is fixed on said housing and with which said moveable closure member cooperates, said diaphragm separating a gas-filled spring chamber from a pressure chamber on which the liquid pressure acts, said valve seat fixed on said housing being connected with said tank connection, said filter element having a double-walled center tube with one end sealingly supported by said pressure regulator and another end sealingly supported on one of said cover and a bottom of said housing element, so that on said clean side an annular chamber connected with said outlet connection is pierced through by a conduit associated with said pressure regulator and provided in said center tube.

2. A liquid filter as defined in claim 1, wherein two of said inlet connection, said outlet connection and said tank connection are formed on said bottom of said housing element parallel with each other.

3. A liquid filter as defined in claim 1, wherein said cup-shaped housing element has a dome-shaped bulge extending to an outside of said bottom, said bulge being covered by said diaphragm and delimiting said spring chamber, said outlet connection being formed on said bottom radially outside of said clamping site of said diaphragm, said tank connection extending centered on said cover, said inlet connection extending eccentrically in respect to said cover coaxially with said outlet connection.

4. A liquid filter as defined in claim 1, wherein said pressure regulator has a tube-shaped support element which is tightly fastened on said bottom together with said diaphragm and which supports said valve seat of said pressure regulator on an inner rim, said center tube having one end seated on an outer circumference of said support element through a sleeve-shaped seal, said center tube having another end which is sealingly supported through a similar seal on an inwardly projecting connector of said cover, said support element having through-openings which connect said clean side of said filter element with said pressure chamber of said pressure regulator.

5. A liquid filter as defined in claim 1, wherein said center tube is formed as a plastic tube and is sealingly guided by one end on a sleeve-shaped extension of said valve seat, said valve seat being fastened in a support element clamped together with said diaphragm, said plastic tube having another end which is guided in said cover and sealed by a shaped seal, said plastic tube having ridges on an outside constituting an annular chamber, said support element having through-opening connecting said clean side of said filter element with said pressure chamber of said pressure regulator.

6. A liquid filter as defined in claim 1, and further comprising a venting connection disposed on said spring chamber and located coaxially with said tank connection.

7. A liquid filter as defined in claim 1, wherein said housing at a bottom of said cup-shaped housing part is provided with said outlet connection and with a centrally located venting connection, said tank connection extending centered on said cover, and said inlet connection extending eccentrically in respect to said tank connection and substantially coaxially with said tank connection.

8. A liquid filter as defined in claim 1, wherein said clamping site of said diaphragm is arranged directly on said cover; and further comprising a ventilation tube fastened by said clamping site and constituting said spring chamber of said pressure regulator; a venting conduit with a venting connection, said ventilating tube connecting said spring chamber with said venting connection through said venting conduit.

9. A liquid filter as defined in claim 1, wherein said cover has an angular ridge on which said clamping site is provided, said angular ridge having a radial opening for connecting said clean side with said pressure chamber; and further comprising a support ring surrounding said angular ridge and sealingly supported between said cover and a facing end cap, said support ring being located radially between said tank connection and said inlet connection for separating said dirt side from said clean side; and a holding ring provided between said end cap on said clean side and a bottom and separating said outlet connector from said dirt side.

10. A liquid filter as defined in claim 9, and further comprising a ventilation tube which is sealingly fastened on said clamping site by a radially extending flange, said ventilation tube making a transition into a widened sleeve section which constitutes said spring chamber, said sleeve section making a transition into a tube section with a lesser diameter, said tube section having a free end which is sealingly guided in a bottom.

11. A liquid filter as defined in claim 10, wherein said ventilation tube is composed of a one-piece plastic element.

12. A liquid filter as defined in claim 10, wherein said ventilation tube includes a metallic spring housing and a flexible plastic tube.

\* \* \* \* \*